Nov. 5, 1946.  C. S. FIELDING  2,410,643

RACK AND PINION MECHANISM

Filed Oct. 17, 1944

Inventor,
Charles Stuart Fielding,
by Walter P. Geyer
Attorney.

Patented Nov. 5, 1946

2,410,643

UNITED STATES PATENT OFFICE 2,410,643

RACK AND PINION MECHANISM

Charles Stuart Fielding, Buffalo, N. Y.

Application October 17, 1944, Serial No. 559,053

3 Claims. (Cl. 74—422)

This invention relates to certain new and useful improvements in rack and pinion mechanisms.

It has for its primary object to provide a mechanism of this character which is so designed and constructed as to automatically insure the proper meshing of the rack with the pinion as such parts are brought into meshing or driving relation.

Another object of the invention is to provide the rack with a displaceable tooth which is free to be momentarily displaced out of its normal pitch line when encountered by a pinion-tooth and then automatically snap into place when the degree of travel has been sufficient to bring the rack into proper mesh with the pinion.

Other features of the invention reside in the construction and arrangement of parts hereinafter described and particularly pointed out in the appended claims.

Figure 1:
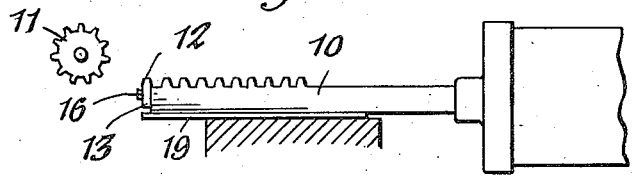
Figure 2:
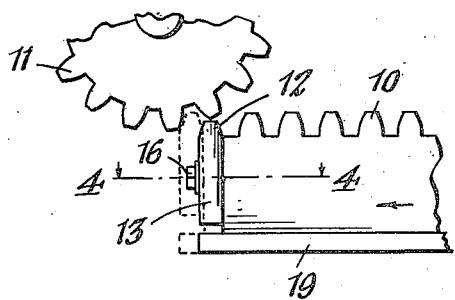
Figure 3:
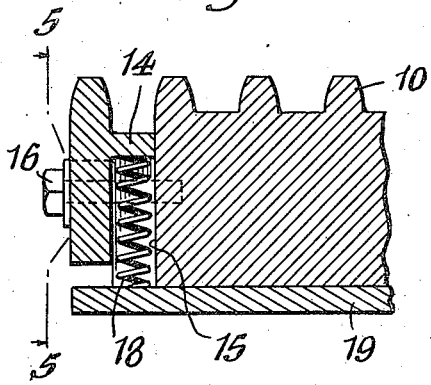
Figure 5:
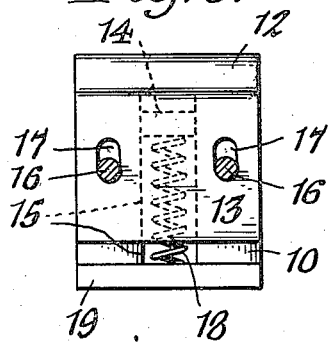
Figure 4:
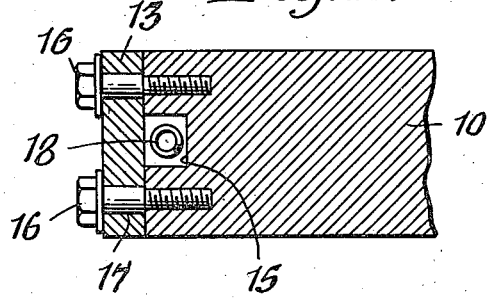

In the accompanying drawing:

Figure 1 is a side elevation of a rack and pinion assembly embodying my invention, the rack shown being movable toward and from driving mesh with the pinion. Figure 2 is an enlarged fragmentary side elevation of the rack and pinion showing the leading or displaceable tooth of the rack in an out of mesh position and being urged to a position to effect meshing of the parts. Figure 3 is an enlarged, fragmentary, vertical section of the displaceable tooth mounting. Figure 4 is a horizontal section taken in the plane of line 4—4, Figure 2. Figure 5 is a front sectional elevation of the tooth mounting taken on line 5—5, Figure 3.

Similar characters of reference indicate corresponding parts through the several views.

This invention has been particularly designed for use with a rack and pinion drive assembly where the rack is brought to and from engagement with the pinion to actuate it intermittently a given distance in either direction and where, during the movement of the rack toward the pinion, due to the overrunning of the pinion after the disengagement of the rack therefrom, the pinion may be out of mesh relative to the rack and difficulty encountered on the next operative stroke. To assure proper intermeshing of this gearing at all times and the proper extent of movement being transmitted to the pinion to perform the given work intended, I provide the rack with a resilient or depressible tooth structure which is free to disappear below the pitch line should it contact a tooth on the pinion rather than the space between adjoining teeth, and at a predetermined time snap into proper mesh.

By way of example, my invention has been shown in connection with a gear and rack assembly for intermittently actuating a loading platform or the like a predetermined distance, the rack 10 being reciprocated hydraulically or otherwise and adapted to be brought into and out of engagement with a pinion 11 for operating the loading platform or the like in one direction and then in the other. At its front or leading end the gear rack is provided with a displaceable tooth 12 formed integrally with a plate 13 and disposed in the same spaced relation to the adjoining rack tooth as are the other teeth of the rack and which constitutes the leading tooth of the rack when it is moved into operative relation with the pinion. This displaceable tooth-bearing plate is in facial bearing contact with the end of the rack for guiding it vertically, viewing the drawing, or in a plane at right angles to the pitch line of the rack. Projecting from its inner side and below the tooth-forming portion thereof, this plate 13 has a guide lug 14 engaging a companion guide slot or groove 15 in the end of the rack. A pair of retaining bolts 16 serve to detachably connect the displaceable tooth-plate in sliding relation with the rack and such plate has upright slots 17 therein through which the bolts pass and which serve to limit the displacement of the tooth to and from its pitch line position. A spring 18 located or housed in the guide groove 15 and bearing at its upper end against the plate-lug 14 and at its lower end against a facing strip 19 applied to the rack serves to normally urge the tooth into its normal pitch line position, shown by dotted lines in Figure 2 and by full lines in Figure 3, wherein the lower ends of the slots 17 abut against the retaining bolts 16.

By this construction, as the gear rack is moved toward the pinion to mesh therewith and should the respective teeth not be in meshing position, then the leading, resiliently mounted tooth 12 of the rack will be displaced downwardly, as shown by full lines in Figure 2, in a plane at right angles to its pitch line by the contacting tooth of the pinion and the moment such leading tooth clears such pinion tooth during the continued travel of the rack it is restored to its normal position by the spring 18 to bring the rack into proper mesh with the pinion, as seen by dotted lines in such figure.

I claim as my invention:

1. In a rack and pinion assembly of the character described, the rack having a groove in the end thereof disposed at substantially right angles to its pitch line, a displaceable tooth-bearing plate in facial contact with the end of said rack and in the same spaced relation to the adjoining rack-tooth as are the other teeth thereof and having a guide lug thereon engaging said rack-groove, and a spring acting on said displaceable tooth for normally urging it to its pitch line position.

2. In a rack and pinion assembly of the character described, the rack having a groove in the end thereof disposed at substantially right angles to its pitch line, a displaceable tooth-bearing plate in facial contact with the end of said rack and in the same spaced relation to the adjoining rack-tooth as are the other teeth thereof and having a guide lug thereon engaging said rack-groove, a spring acting on said displaceable tooth for normally urging it to its pitch line position, and means for displaceably connecting the lugged tooth with the rack and for limiting its movement to and from its pitch line position.

3. In a rack and pinion assembly of the character described, the rack having a groove in the end thereof disposed at substantially right angles to its pitch line, a displaceable tooth-bearing plate in facial contact with the end of said rack with the tooth thereof constituting the leading tooth of such rack and having a guide lug thereon below its tooth engaging said rack-groove, bolt and slot means for detachably and slidingly connecting the tooth-plate with the rack and for limiting its movement, and a spring housed in said groove and engaging said plate-lug for normally urging the plate in a direction to bring its tooth into its pitch line position.

CHARLES STUART FIELDING.